United States Patent [19]
Brockman

[11] Patent Number: 5,884,300
[45] Date of Patent: Mar. 16, 1999

[54] INVENTORY PIPELINE MANAGEMENT SYSTEM

[75] Inventor: Richard Brockman, Kirkland, Wash.

[73] Assignee: AT&T Wireless Services Inc., Kirkland, Wash.

[21] Appl. No.: 850,096

[22] Filed: May 1, 1997

[51] Int. Cl.⁶ .................................................. G06F 17/230
[52] U.S. Cl. ........................ 707/2; 707/3; 705/8; 705/28; 705/29; 364/478
[58] Field of Search .................................... 707/3, 10, 101, 707/102, 103, 2, 4; 705/28, 29, 5, 8, 22; 364/478, 221; 235/385; 340/825

[56] References Cited

U.S. PATENT DOCUMENTS

| | | | |
|---|---|---|---|
| 4,459,663 | 7/1984 | Dye | 705/29 |
| 4,636,950 | 1/1987 | Caswell | 707/2 |
| 4,887,207 | 12/1989 | Natarajan | 705/10 |
| 4,887,218 | 12/1989 | Natarajan | 705/8 |
| 4,972,318 | 11/1990 | Brown et al. | 705/26 |
| 5,113,349 | 5/1992 | Nakamura | 364/478 |
| 5,128,861 | 7/1992 | Kagami et al. | 705/10 |
| 5,216,612 | 6/1993 | Cornett et al. | 364/468 |
| 5,231,567 | 7/1993 | Matoba et al. | 364/468 |
| 5,237,495 | 8/1993 | Morii | 705/5 |
| 5,285,392 | 2/1994 | Kyle et al. | 364/468 |
| 5,287,267 | 2/1994 | Jayaraman et al. | 705/10 |
| 5,463,555 | 10/1995 | Ward et al. | 364/468 |
| 5,479,343 | 12/1995 | Matoba et al. | 364/468 |
| 5,537,313 | 7/1996 | Pirelli | 705/28 |
| 5,712,989 | 1/1998 | Johnson | 705/28 |

*Primary Examiner*—Wayne Amsbury
*Assistant Examiner*—Thu-Thao Havan

[57] ABSTRACT

An inventory model and supporting process provides a full stream inventory management solution for the inventory that is normally present between the manufacturing and field consumption points. The model extends "just-in-time" principles to levels that support a "build today which was consumed yesterday" production mode, without requiring the use of purchase orders and the related transactions. The inventory model minimizes inventory impacts related to consumption fluctuations by maintaining a constant "days on hand" inventory approach. The model supports multiple field locations and may be designed to run on a single computer system.

20 Claims, 7 Drawing Sheets

INVENTORY PIPELINE MANAGEMENT SYSTEM

BACKGROUND OF THE INVENTION

1. Field of Invention

This invention relates to a self-correcting and self-analyzing inventory pipeline management system.

2. Description of Related Art

Traditional production planning/product distribution systems are often complex and use many separate computer systems and databases. Often, the manufacturing facility, warehouse and field offices do not share inventory or production information and operate numerous separate databases to track such items as inventory, production planning, account information, etc.

Consequently, the lack of integration and inefficiencies inherent in the prior art systems, results in a lack of proper control of products and materials throughout the supply chain. These systems do not rapidly respond to changes in market conditions or customer demand. Ultimately, the lack of a well-integrated, accurate and comprehensive inventory management system results in a direct loss of time and money.

SUMMARY OF THE INVENTION

An inventory pipeline management system provides an efficient full-stream inventory management solution for the inventory that is normally present between the manufacturing and the field consumption points. The system considers each field element (i.e., field office or local distribution center) as a unique entity and models product inventory levels required to support each field element's operations.

Using a model to determine a model inventory value for products at each field element in an inventory supply chain, key data elements are localized and compared with actual inventory values collected from the field elements to determine if a need for replenishment exists. As a result, the self-correcting and self-analyzing inventory pipeline management system provides an efficient use and collection of inventory data and eliminates the needless paperwork, multiple databases and computer systems of the prior art.

BRIEF DESCRIPTION OF THE DRAWINGS

The invention is described in detail with reference to the following drawings, wherein like numerals represent like elements.

DETAILED DESCRIPTION OF PREFERRED EMBODIMENTS

The inventory pipeline management system considers each field element as a unique entity and establishes inventory levels on a product-by-product basis as required to support each field element's operations using one central computer system. Inventory management decisions are made automatically from a comparison of model-determined inventory values and actual inventory values collected from the field. The system is less complex, can be configured to use a single computer system and database, and can provide timely, accurate inventory data to management.

Figure 1:
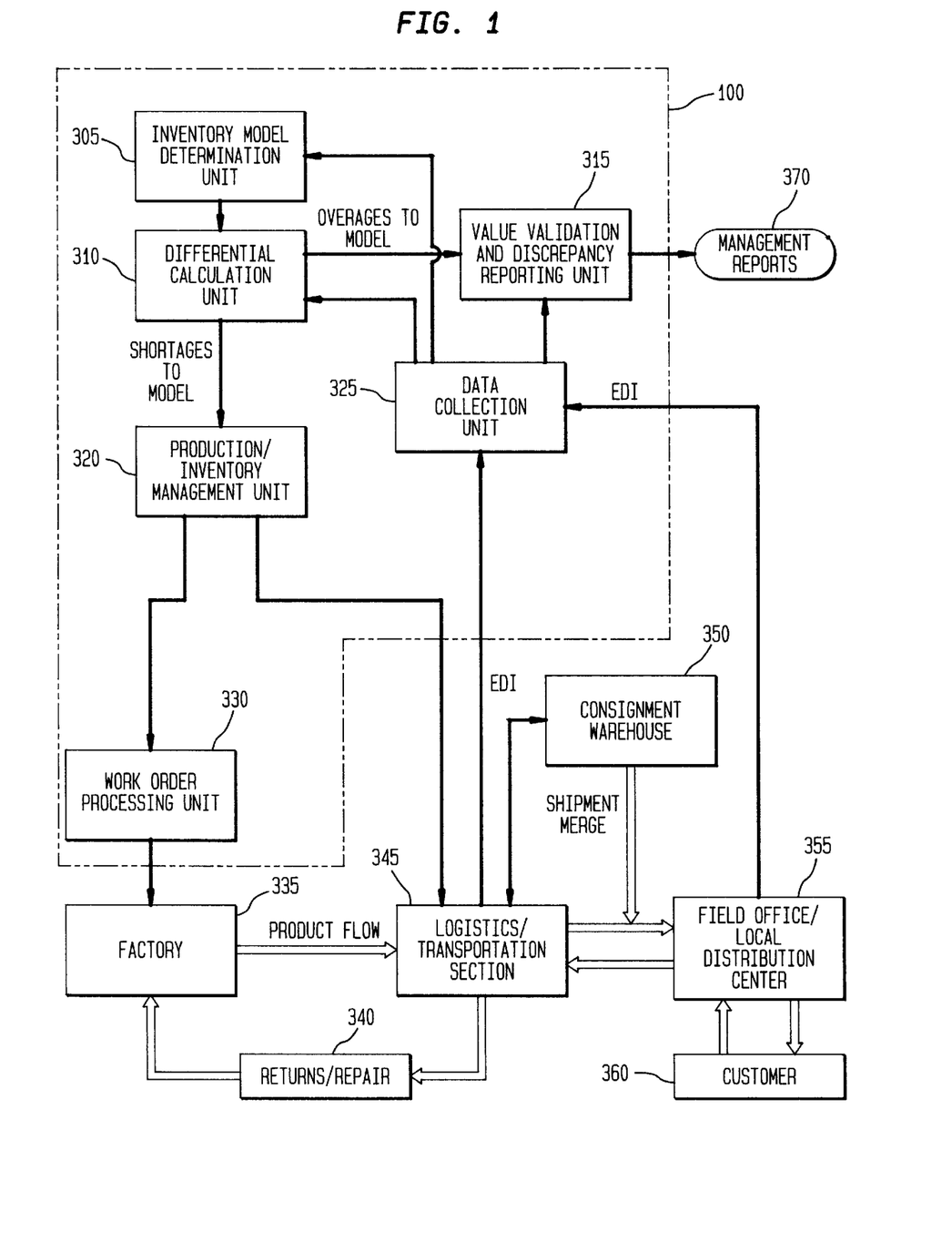
FIG. 1 is a block diagram of an inventory pipeline management system.

For example, FIG. 1 illustrates how the inventory pipeline management system 100 may be configured. Model inventory values for each product and field office/local distribution center are determined by an inventory model determination unit 305 based on several localized key data elements.

A data collection unit 325 collects data from a logistics/transportation section 345 and the field office/local distribution centers 355 and determines an actual inventory value for each product and field office/local distribution center 355.

A differential calculation unit 310 compares the actual inventory values from the data collection unit 325 and the model inventory values from the inventory model determination unit 305. Based on the comparison, the differential calculation unit 310 determines whether an overage or a shortage of inventory exists from the model for each product and field office/local distribution center 355.

If a shortage in inventory exists (i.e. an actual inventory value is less than the model inventory value determined by the inventory model determination unit 305), a demand signal is sent to the production/inventory management unit 320. In response to the demand signal, the production/inventory management unit 320 determines whether the products must be produced or picked from consignment inventory.

If the products must be picked from consignment inventory, a signal is sent to the logistics/transportation section 345 to coordinate delivery of the needed product from a third party consignment warehouse 350. The delivery and "merging" of the needed product with the products supplied from the factory 335 can take place along the route to or at the field office/local distribution center 355.

If products must be produced, a signal is sent to the work order processing unit 330. The work order processing unit sends a work order to the factory 335, which then produces the required products.

The factory 335 forwards the completed products to the logistics/transportation section 345, which then ships directly to the field office/local distribution center 355. The products are then shipped to or picked-up by the customer 360. The logistics/transportation section 345 also sends returned products and/or products requiring repairs 340 back to the factory 335 for further processing.

If the differential calculation unit 310 determines an overage, (i.e. an actual inventory value is greater than the model inventory value determined by the inventory model determination unit 305), an overage signal is sent to the value validation discrepancy reporting unit 315. The value validation and discrepancy reporting unit 315 also receives actual inventory values from the data collection unit 325. The value validation and discrepancy reporting unit 315 flags discrepancies between calculated and actual product inventory data and generates management reports 370.

Figure 2:
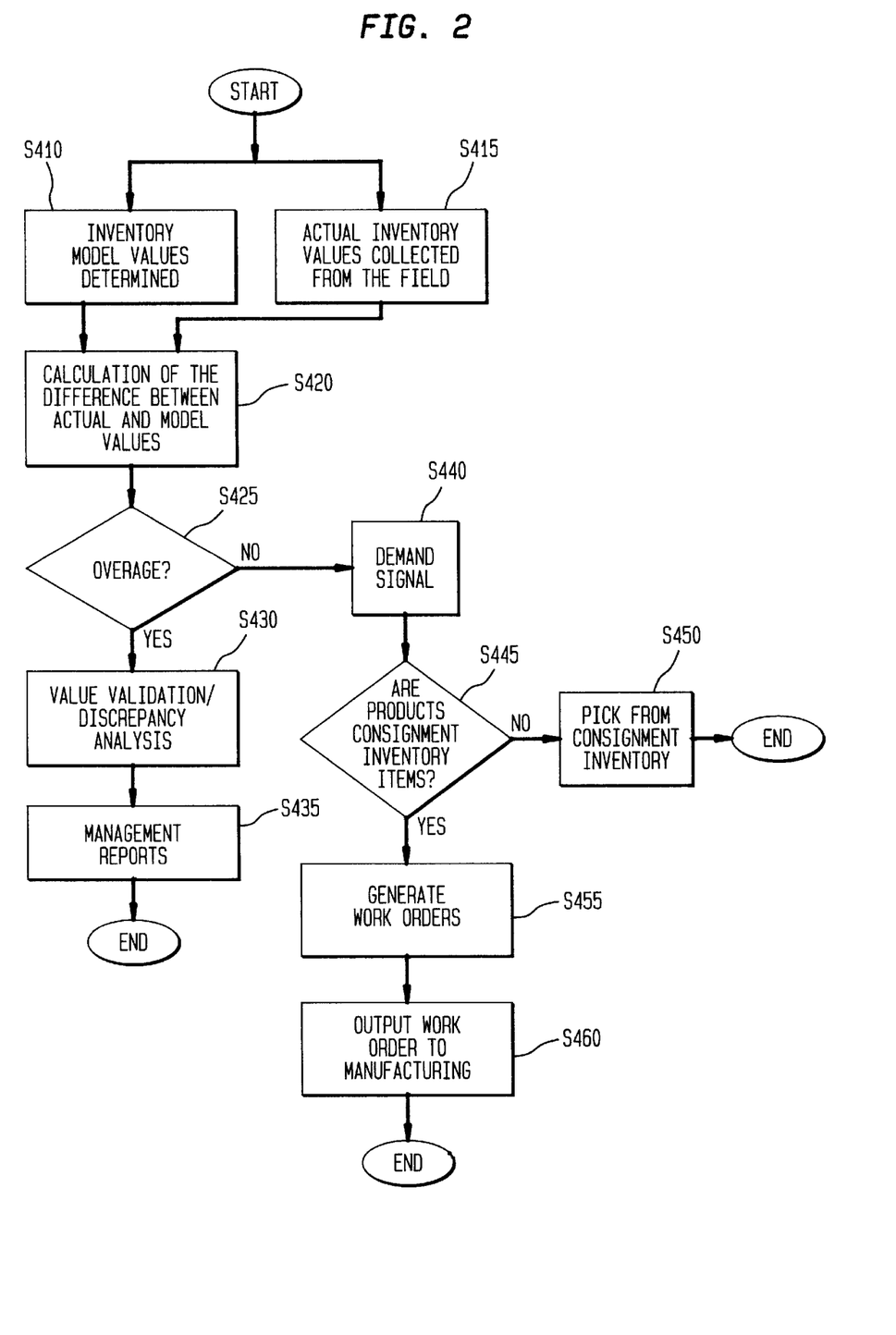
FIG. 2 is a flowchart of the inventory pipeline management system.

FIG. 2 is a flowchart that describes the operation of the inventory pipeline management system 100 shown in FIG. 1. At step S410, the inventory model determination unit 305 generates model inventory values from key data elements that are localized. At step S415, the data collection unit 325 collects actual inventory data from the field office/local distribution centers 355 and logistics/transportation section 345 and calculates actual inventory values. At step S420, the differential calculation unit 310 compares the actual inventory values from step S415 with the model inventory values from step S410 and calculates the net difference between the model and the actual inventory values.

At step S425, the differential calculation unit 310 determines whether an overage exists between the actual and model inventory values. If an overage exists, at step S430, the value validation discrepancy reporting unit 315 validates the inventory data values and identifies discrepancies. At step S435, the value validation and discrepancy reporting unit 315 generates management reports to alert management to possible problem areas in the inventory model.

At step S440, the differential calculation unit 310 creates a net demand signal if an overage does not exist at step S425. At step S445, the production/inventory management unit 320 determines whether the required products must be built or picked from inventory. At step S455, the work order processing unit 330 generates a work order if products must be built. At step S460, the work order processing unit 330 sends the completed work order for the required products to the factory 335 for production.

If, at step S445, the production/inventory management unit 320 determines that products are in inventory, a signal is sent to the logistics/transportation section 345 to have the products picked from the consignment warehouse 350 and a "merge" along the product route from the factory 335 to the field office/local distribution center 355 is arranged, if necessary. At step S450, required products are picked from inventory and sent to the appropriate field office/local distribution center 355.

The inventory pipeline management system 100 can collect up-to-date inventory data on a frequent basis, e.g., daily, and automatically determine if inventory levels for products at each field office/local distribution center 355 are in accordance with the inventory model. Therefore, the inventory pipeline management system 100 supports a "build today which was consumed yesterday" approach to inventory management. That is, the inventory pipeline management system 100 determines current product requirements based on the previous day's inventory activity/product consumption.

In addition, the inventory model can be updated on a frequent basis to account for changes in desired inventory levels for individual products and/or field office/local distribution centers 355. The inventory model can be automatically updated using data collected from each field office/local distribution center 355 and the logistics/transportation section 345, as more fully described below in FIG. 3, or manually by managers after reviewing the validation and discrepancy reports.

Figure 3:
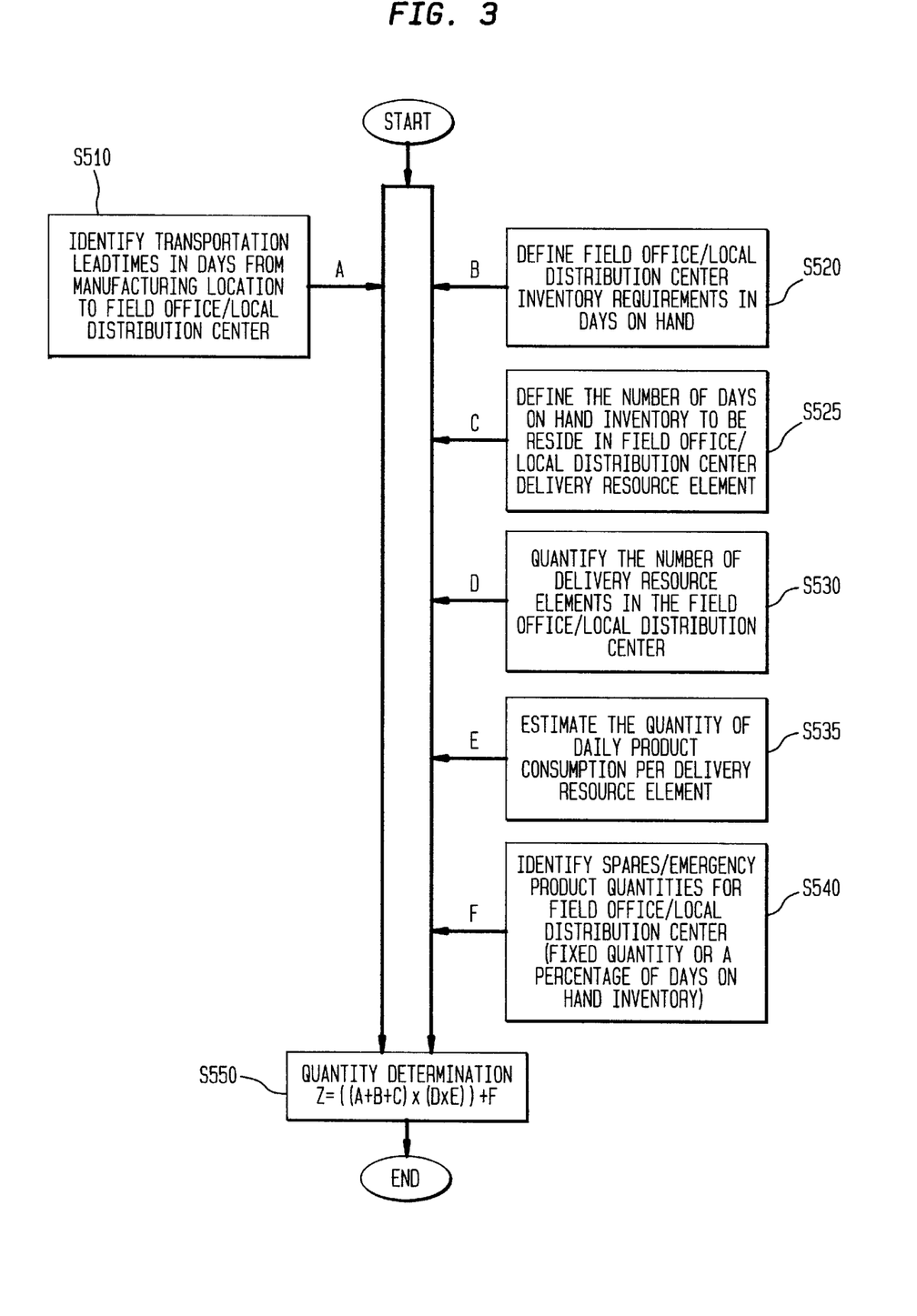
FIG. 3 is a flowchart of an inventory model determination.

FIG. 3 is a flowchart depicting the determination of the model inventory values by the inventory model determination unit 305 in greater detail. At steps S510–S540, the data collection unit 325 collects data for each product and field office/local distribution center 355 and loads the data into the inventory model determination unit 305 for an inventory model value determination. The data collected from the logistics/transportation section 345 is as follows:

Step S510-(A)-The transportation lead time in days from the manufacturing location to the field office/local distribution center 355;

The data collected from the field offices/local distribution centers 355 is as follows:

Step S520-(B)-Field office/local distribution center inventory requirements in days-on-hand (i.e., the amount of inventory residing at a particular location to meet production/supply demand expressed in days);

Step S525-(C)-The number of days-on-hand inventory to reside in the field office/local distribution center delivery resource elements. The delivery resource elements are defined as the number of delivery units that together act as a bottleneck to product distribution. The delivery resource elements can be delivery vehicles, an order desk for picking, a shelf, people loading products into boxes for mail delivery, etc.;

Step S530-(D)-The number of delivery resource elements in each field office/local distribution center 355;

Step S535-(E)-The quantity estimate of daily product consumption per delivery resource element; and Step S540-(F)-The quantities of spare or emergency products for each field office/local distribution center 355.

At step S550, the inventory model determination unit 305 determines a model inventory value for each product at each field office/local distribution center 355 from a formula based on the above values as shown in Equation 1:

$$Z=((A+B+C)\times(D\times E))+F \qquad (1)$$

The model inventory value Z represents the total amount of a product in the inventory supply chain, or pipeline, as determined in accordance with the inventory model. Equation 1 is an example of how the inventory model determination unit 305 can model inventory values. Other equations or modeling methods can be used.

Figure 4:
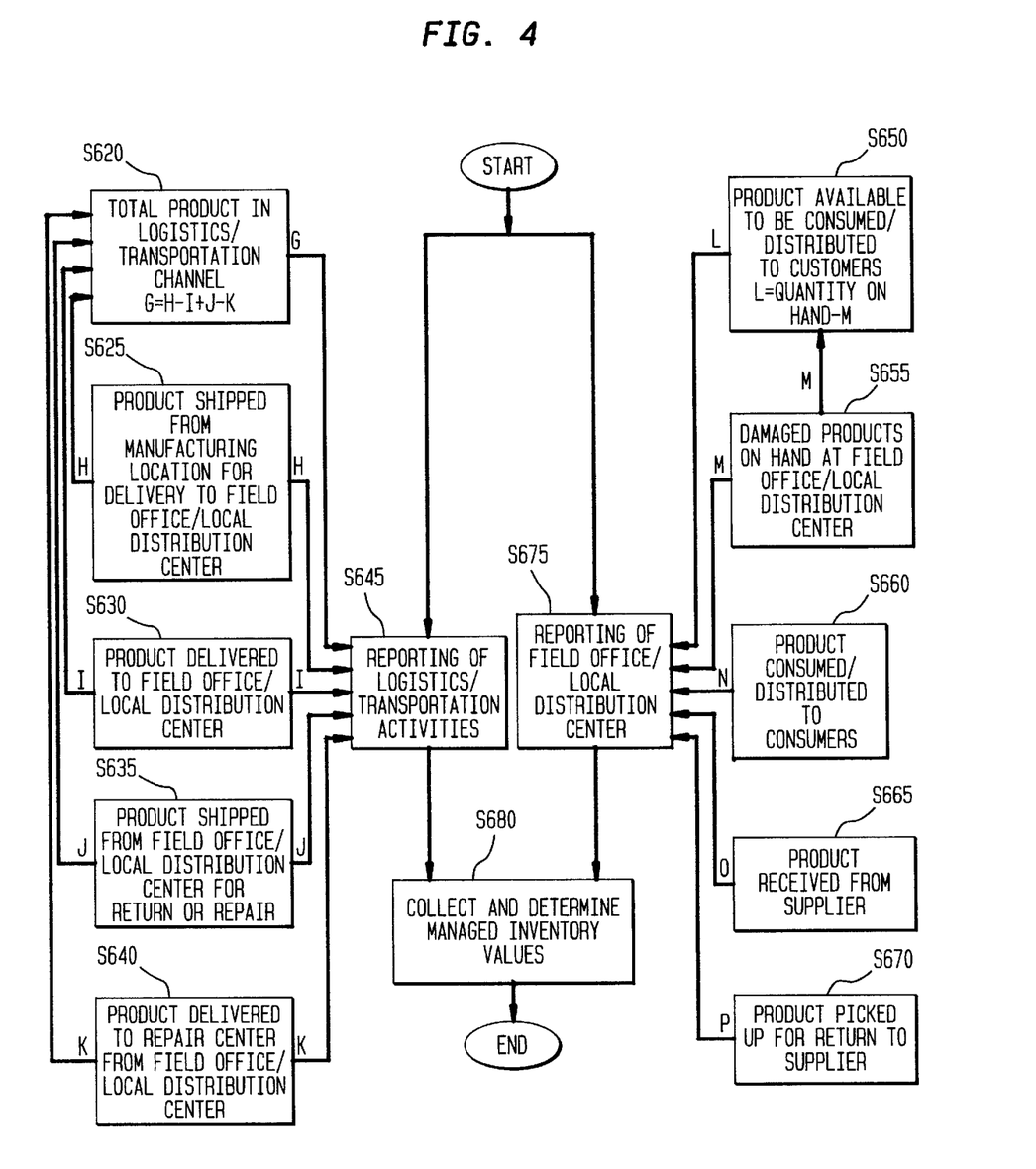
FIG. 4 is a flowchart of a process for collecting and determining field inventory data.

FIG. 4 describes how the data collection unit 325 collects data and determines the actual inventory values for each product and field office/local distribution center 355.

At step S645, logistics/transportation product distribution data are input from the logistics/transportation section 345 into the data collection unit 325 as follows:

Step S625-(H)-Product shipped from a manufacturing location for delivery to a field office/local distribution center 355;

Step S630-(I)-Product actually delivered to the field office/local distribution center 355;

Step S635-(J)-Product shipped from the field office/local distribution center 355 for return or repair;

Step S640-(K)-Product actually delivered to repair center from the field office/local distribution center 355; and Step S620-(G)-The total products in the logistic/transportation channel. The total products in logistic/transportation channel (G) is calculated based on the above values as shown in Equation 2:

$$G=H-I+J-K \qquad (2)$$

Figure 5A:
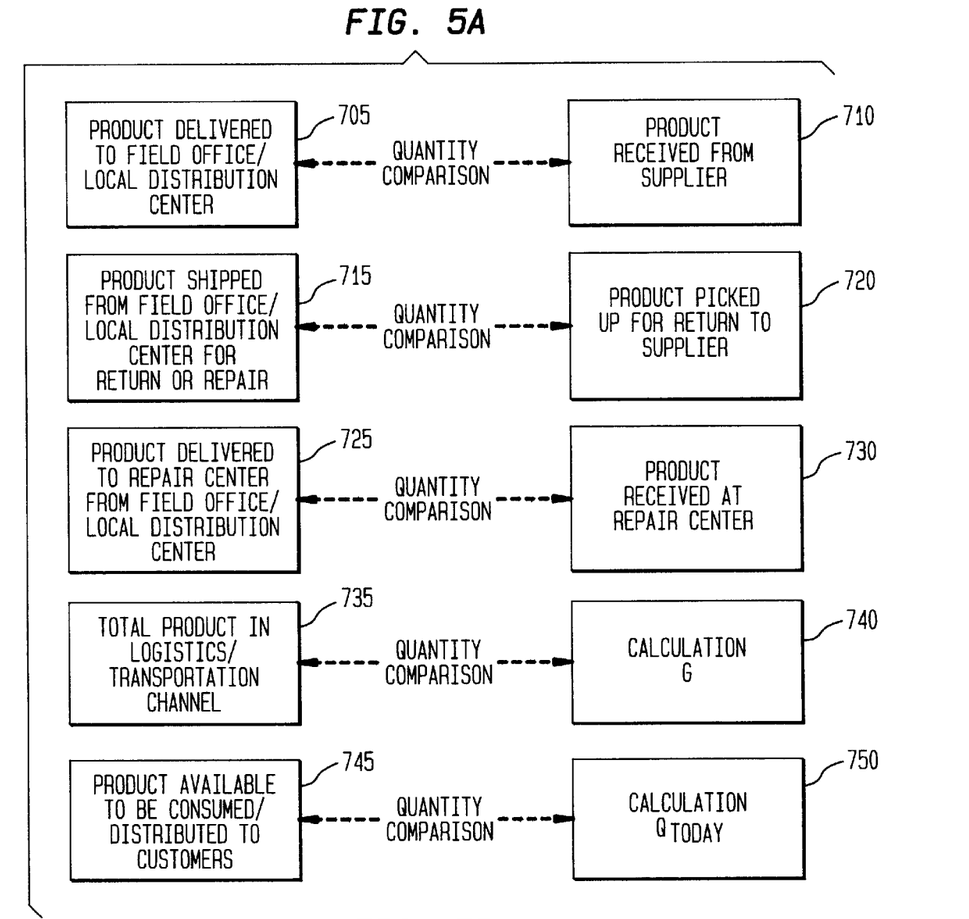
FIG. 5A shows an example of comparisons made during value validation and discrepancy reporting.

The calculated value for total products in logistic/transportation channel G is also input into the validation discrepancy reporting unit 315, as shown in FIG. 5A.

At step S675, data is input from each reporting field office/local distribution center 355 into the data collection unit 325 for each product as follows:

Step S655-(M)-Damaged products on hand at the field office/local distribution center 355;

Step S660-(N)-Products consumed or distributed to customers from the field office/local distribution center 355;

Step S665-(O)-Product received by the field office/local distribution center 355 from supplier;

Step S670-(P)-Products picked up from the field office/local distribution center 355 for return to supplier; and Step S650-(L)-Products available at the field office/local distribution center 355 to be consumed /distributed to customers. The quantity L is determined as shown in Equation 3:

$$L = \text{Quantity of products on hand} - M \quad (3)$$

At step S680, the data collection unit 325 determines the actual inventory value for each product at each field office/local distribution center 355. The actual inventory value for each product at each field office/local distribution center 355 is determined by adding the quantities G and L together. Therefore, the actual inventory value (G+L) represents the total actual amount of a product in the inventory pipeline.

FIG. 5A shows the comparisons made by the value validation and discrepancy unit 315 of the reported inventory data collected by the data collection unit 325 from each field office/local distribution center 355 and the logistics/transportation section 345 against calculated inventory data for each product. As appropriate, data required by the value validation and discrepancy unit 315 are collected by the data collection unit 325 and input into the value validation and discrepancy unit 315. The value validation and discrepancy unit 315 also calculates values used in some comparisons described below.

The value validation and discrepancy unit 315 compares quantities for each field office/local distribution center 355 as follows:

1) products delivered to the field office/local distribution center 705 and the products received from the supplier 710,
2) products shipped from field office/local distribution center for return or repair 715 and the products picked up for return to the supplier 720,
3) products delivered to repair center from field office/local distribution center 725 and the products received at repair center 730,
4) total products in the logistic transportation channel 735 with the calculation G of the total products in the logistic transportation channel (from FIG. 4) 740, and
5) products available to be consumed or distributed to customers 745 with calculation $Q_{today}$ of the products available to be consumed or distributed to customers (from FIG. 6) 750.

Figure 5B:
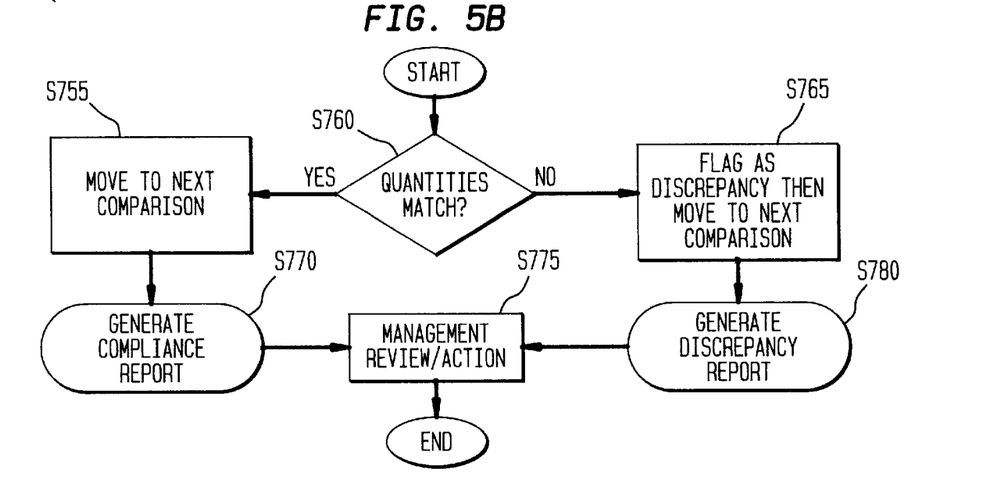
FIG. 5B is a flowchart of a value validation and discrepancy reporting process.

FIG. 5B is a flowchart of the value validation and discrepancy reporting process. At step S760, the value validation and discrepancy reporting unit 315 determines whether the two quantities being compared match. The quantities that are compared in step S760 are the comparisons identified in FIG. 5A above. If the quantities match in step S760, the process moves to step S755 where the next comparison is made. Then, at step S770, a compliance report is generated. At step S775, the report is output.

If, at step S760, the quantities do not match, the discrepancy is flagged at step S765 and the process moves to the next comparison. At step S780, a discrepancy report is generated. Then, at step S775, the report is output.

Figure 6:
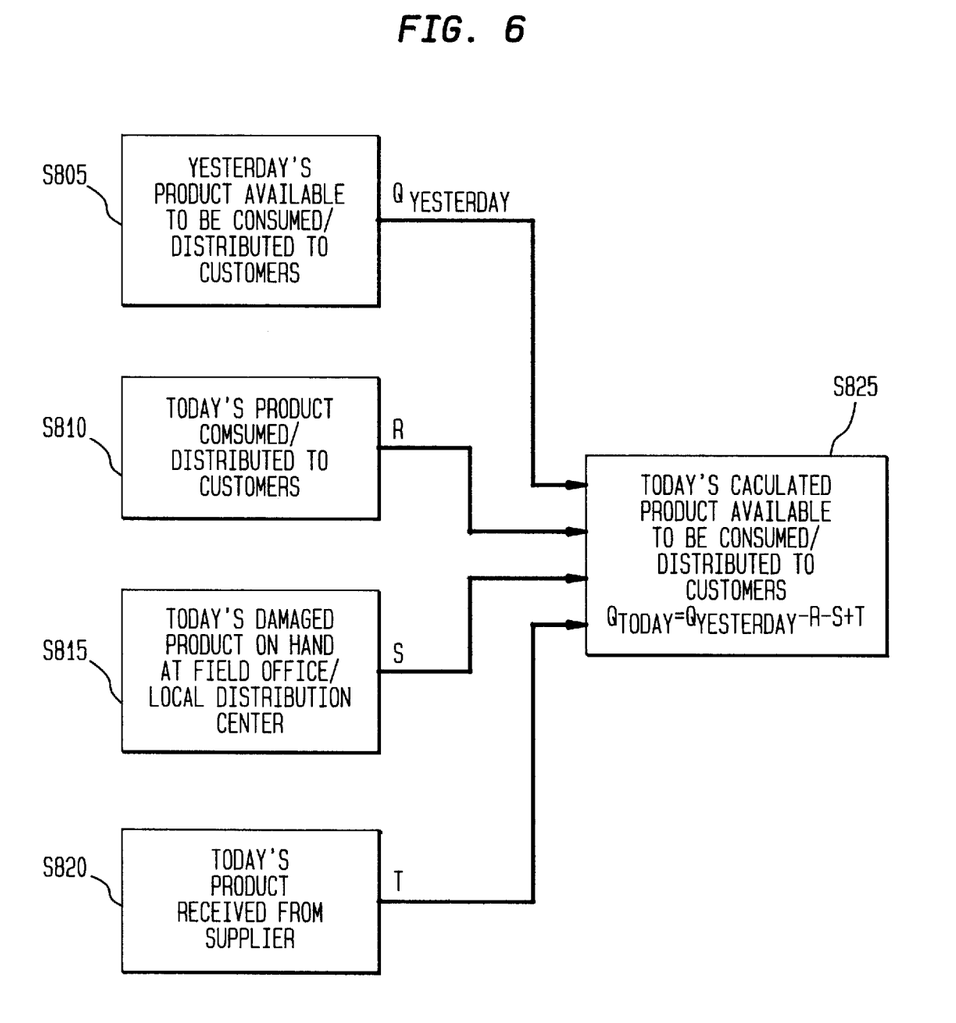
FIG. 6 is a flowchart for calculating the products available to be consumed or distributed to customers.

FIG. 6 describes how a given day's calculated product available to be consumed or distributed to customers, $Q_{today}$, is determined by the value validation and discrepancy reporting unit 315. $Q_{today}$ is an input for value validation and discrepancy reporting in FIG. 5A.

The product available to be consumed or distributed to customers for any given day, $Q_{today}$, is determined from inputs of yesterday's product available to be consumed or distributed to customers ($Q_{yesterday}$) 805, today's product consumed or distributed to customers (R) 810, today's damaged product on hand at the field office/local distribution center (S) 815, and today's product received from the supplier (T) 820.

At step S825, today's calculated product available to be consumed or distributed to customers is determined as shown in Equation 4:

$$Q_{today} = Q_{yesterday} - R - S + T \quad (4)$$

Figure 7:
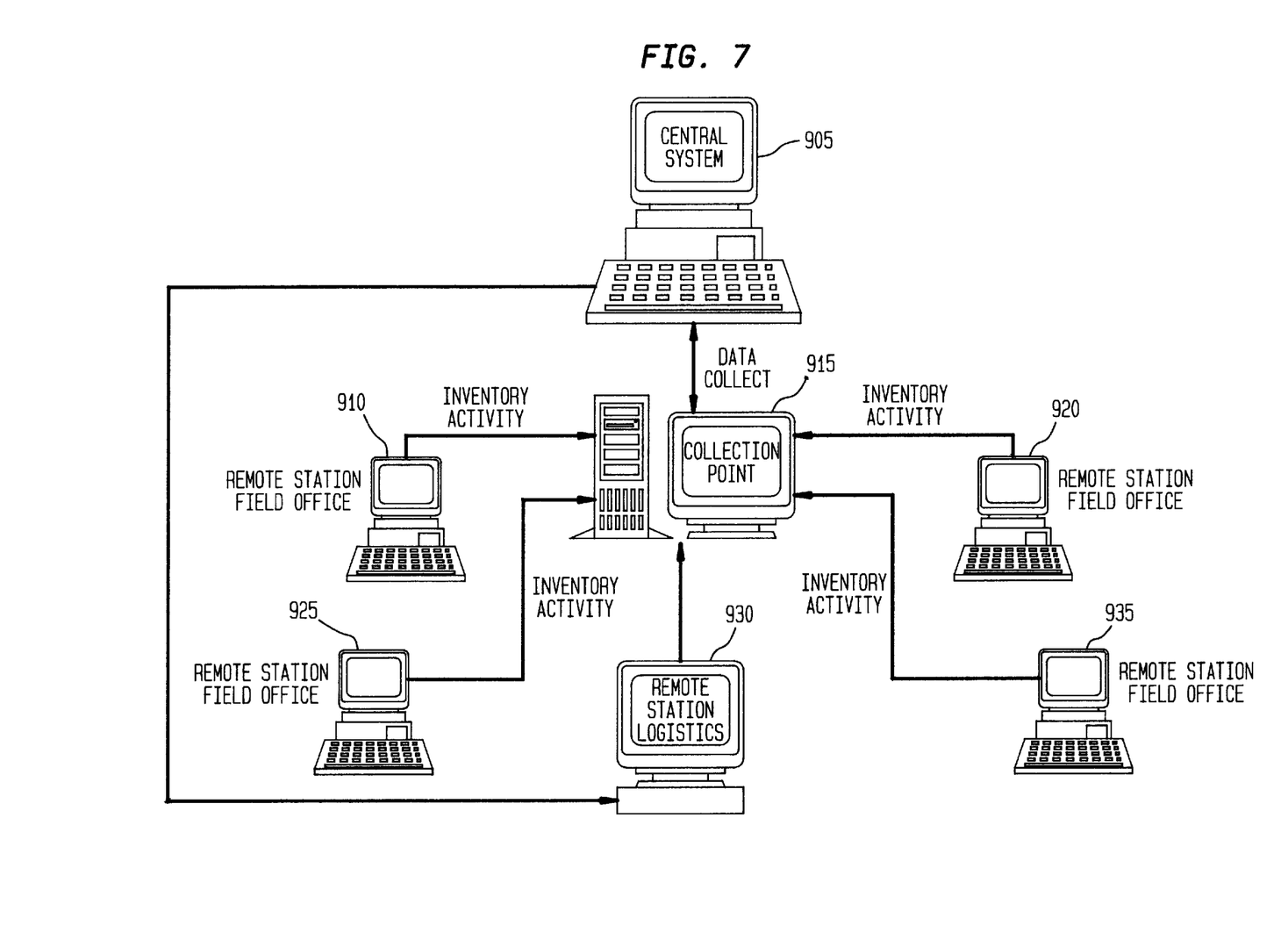
FIG. 7 is a diagram of a system for implementing the inventory pipeline management system.

FIG. 7 shows a computer system on which the inventory pipeline management system 100 may be configured to operate. In this example, the inventory model unit 305, differential calculation unit 310, the value validation and discrepancy reporting unit 315, and production/inventory management unit 320 are implemented as software modules in a general purpose computer 905. The data collection unit 325 is implemented as a software module in a general purpose computer 915. Data from field offices/local distribution centers 355 is output to the general purpose computer 915 by general purpose computers 910,920,925,935 located at each field office/local distribution center 355. The logistics/transportation section 345 outputs data to general purpose computer 915 through the general purpose computer 930.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. An inventory management computer system, comprising:

means for determining a plurality of model inventory values for a plurality of products the system based on an inventory model;

means for collecting actual inventory data for the products from a plurality of field elements;

means for determining a plurality of actual inventory values;

means for outputting a signal based on comparisons of the model inventory values and the actual inventory values; and means for making inventory management decisions based upon the signal output.

2. The inventory management computer system comprising:

an inventory model determination unit that determines a model inventory value for at least one field element based on a plurality of inventory management parameters;

a data collection unit that obtains a plurality of actual inventory data from the at least one field element and determines an actual inventory value based on the actual inventory data;

a differential calculation unit that outputs a signal based on a comparison of the model inventory value and the actual inventory value;

a production/inventory management unit that determines whether an item must be produced or picked from inventory based on the signal output from the differential calculation unit; and a value validation and discrepancy reporting unit that outputs data for generating a plurality of management reports based on actual inventory data received from the data collection unit and comparison data received from the differential calculation unit.

3. The inventory management computer system of claim 2, wherein the inventory model determination unit determines the plurality of inventory management parameters for each element without the use of purchase orders.

4. The inventory management computer system of claim 2, wherein the inventory model determination unit determines the plurality of inventory management parameters for each element in an inventory supply chain based on:

a transportation lead-time from a factory to each field location;

an amount of inventory to reside at each field location;

an amount of inventory to reside in each delivery resource element;

a number of delivery resource elements at each field location;

a rate of daily consumption per delivery resource element; and an amount of inventory to be held in reserve by each field location.

5. The inventory management computer system of claim 2, wherein the data collection unit collects data by part number.

6. The inventory management computer system of claim 2, wherein the differential calculation unit determines whether a shortage of inventory exists or an overage of inventory exists based upon data inputs from the inventory model determination unit and the data collection unit.

7. The inventory management computer system of claim 6, wherein the differential calculation unit outputs a demand signal to the production/inventory management unit when a shortage exists and an overage signal to the value validation and discrepancy reporting unit when an overage exists.

8. The inventory management computer system of claim 2, wherein the production/inventory management unit outputs either a signal generating a work order when an item is to be produced or a signal to a logistics or transportation section to have an item picked from consignment inventory.

9. The inventory management computer system of claim 2, wherein the value validation and reporting unit detects and flags missing data and variances in data between data input from the data collection unit and data input from the differential calculation unit.

10. The inventory management computer system of claim 9, wherein the value validation and reporting unit generates a compliance report if no variances are detected in the input data.

11. A method of operation of an inventory management computer system, the method comprising:

using an inventory model to determine a plurality of model inventory values for a plurality of products:

collecting actual inventory data from a plurality of field elements;

generating actual inventory values from the actual inventory data;

comparing selected actual inventory values and model inventory values;

outputting a signal based upon a comparison of the model inventory values and the actual inventory values; and making inventory management decisions based upon the signal output.

12. A method of operation of an inventory management computer system, the method comprising:

creating an inventory model to determine model data based on a plurality of inventory management parameters for at least one distribution element;

collecting a plurality of field data from the at least one distribution element in an inventory supply chain;

comparing the model data and collected field data;

outputting a signal based upon the comparison of the model data and collected field data;

making an inventory management decision based on the signal output.

13. The method of claim 12, further comprising validating field data and reporting discrepancies based on field data and comparison data.

14. The method of claim 12, wherein the inventory management decisions are made without the use of purchase orders.

15. The method of claim 12, wherein the inventory model is used to determine the plurality of inventory management parameters for each element based on a transportation lead-time from a factory to each field location, an amount of inventory to reside at each field location, an amount of inventory to reside in delivery resource elements, a number of delivery resource elements in use at each field location, a rate of daily consumption per delivery resource element, and an amount of inventory to be held in reserve by each field location.

16. The method of claim 12, wherein the plurality of field data is collected by part number.

17. The method of claim 12, wherein the signal output based upon the comparison of the model data and collected field data represents whether a shortage of inventory exists or an overage of inventory exists.

18. The method of claim 12, wherein the management decision comprises outputting either a signal generating a work order when an item is to be produced or a signal to a logistics or transportation section to have an item picked from inventory.

19. The method of claim 13, further comprising detecting and flagging missing data and variances between the field data and the comparison data.

20. The method of claim 19, further comprising generating a compliance report if no variances are detected in the input data.

* * * * *